US006259026B1

(12) United States Patent
Dwivedi

(10) Patent No.: US 6,259,026 B1
(45) Date of Patent: Jul. 10, 2001

(54) ELECTRICAL LEAD

(76) Inventor: Mahesh Chanda Dwivedi, 53 Syed Amir Ali Avenue, 4th Floor, Calcutta 700019, West Bengal (IN)

( * ) Notice: Subject to any disclaimer, the term of this patent is extended or adjusted under 35 U.S.C. 154(b) by 0 days.

(21) Appl. No.: 09/285,968

(22) Filed: Apr. 1, 1999

(30) Foreign Application Priority Data

Sep. 8, 1998 (IN) .......................................... 1609/CAL/98

(51) Int. Cl.7 ...................................................... H02G 3/02
(52) U.S. Cl. .......................................... 174/68.1; 428/544
(58) Field of Search ................................ 174/68.1, 94 R, 174/135, 136; 428/5, 12, 544, 919

(56) References Cited

U.S. PATENT DOCUMENTS 3,190,086 * 6/1965 Klein ....................................... 428/5
3,267,203 * 8/1966 Rosenberg ............................ 174/68
5,069,948 * 12/1991 Fromson ................................ 428/54
5,916,696 * 6/1999 Abys et al. ......................... 428/670

* cited by examiner

*Primary Examiner*—Dean A. Reichard
*Assistant Examiner*—Adolfo Nino
(74) *Attorney, Agent, or Firm*—Michael J. Striker

(57) ABSTRACT

An electrical lead for supplying electrical energy is improved by the invention with regard to its aesthetic effect by forming it from aesthetically pleasing and electrically improved conducting sections (1, 2, 3) connected to one another in a chain. Such electrical leads may be called the Maya Electrical Transmission system.

10 Claims, 1 Drawing Sheet

ELECTRICAL LEAD

BACKGROUND OF THE INVENTION

1. Field of the Invention

The invention relates to an electrical lead and, more particularly, to an electrical lead that is used for transmitting electrical energy in buildings.

2. Prior Art

Known leads include overland leads, cables, wiring, motor windings and connections consisting of simple straight wires. Where such simple wires are visibly laid, the mere sight of these is not aesthetically pleasing to a human observer. This applies above all in cultural circles in which aesthetic aspects and the harmony of the human spirit with its surroundings plays an important role in everyday life.

SUMMARY OF THE INVENTION

It is therefore the object of the invention to improve known electrical leads and lead systems, particularly in regard to their aesthetic effect.

According to the invention this object is achieved in that the electrical lead is formed of aesthetically pleasing electrically conducting sections that are connected to one another. These sections fulfill double function. On the one hand they conduct the electrical current and on the other hand they are pleasant to look at.

While known attempts seek to achieve an aesthetic improvement of electrical leads by way of coverings, the invention proceeds in the reverse way in that it actually directs the attention to the leads and surprisingly achieves the desired aesthetic effect by suitable shaping of the leads.

In order to attain an economic use of material in a preferred embodiment of the invention the electrically conducting sections are lined up or arranged in a chain. Thus with relatively little material large distances can be spanned. The invention however also encompasses arrangements that deviate from the chain arrangement, for example when a particular aesthetic effect is to be achieved.

In one embodiment of the invention the electrically conducting sections and/or chains consist of an electrically well conducting material, preferably copper, or of a material provided with an electrically conducting coating. For example, a whole chain may be formed as one piece from plastic and subsequently be coated or galvanized with a conducting paste.

In a preferred embodiment the electrically conducting sections are made from wire bent in the shape of outlines of one or more two-dimensional geometric figures such as squares, rectangles, triangles, circles, polygons, ellipses, arcs, spirals or stars. Such wire figures may be manufactured by machine in a simple manner and connected to one another, wherein a relatively large lead cross-section for conducting higher currents with a relatively low ohmic resistance is provided. With a suitably skilled selection and arrangement of the geometric figures these may continuously be bent from one or more endless wires so that neither the wires need to be cut nor do the sections need to be connected to one another.

In another embodiment of the invention the electrically conducting sections are one or more planar bodies in the form of two-dimensional geometric figures such as squares, rectangles, triangles, circles, polygons, ellipses, arcs, spirals or stars, which are made of sheet metal or electrically conducting foil. These planar bodies can be manufactured in a simple manner by cutting out and punching by machine, wherein preferably at the same time a continuous chain is formed. When visible surfaces of the figures are punched at the same time, even further ornaments may be impressed.

For a very special purpose a further embodiment form is recommended in which the electrically conducting sections are formed like outlines of one or several three-dimensional geometric figures such as cubes, parallelepipeds, tetrahedrons, pyramids, spirals or stars of wire. This embodiment is suitable particularly for leads hanging freely in space, for example for a hanging lamp, if the aesthetic effect is to be brought to the center of attention of the observer.

For increasing the aesthetic effect the geometric figures may be arranged interlaced in one another. As such furthermore the electrical conduction and the mechanical rigidity of the lead can be improved.

By lining up various geometric figures in a chain one obtains a larger number of possible combinations for a lead, so that a practically unlimited number of various ornaments is possible. This variety may be even further increased by lining up the same or various geometric figures of varying sizes in a chain.

BRIEF DESCRIPTION OF THE DRAWING

The objects, features and advantages of the invention will now be illustrated in more detail with the aid of the following description of the preferred embodiments, with reference to the accompanying figures in which.

DESCRIPTION OF THE PREFERRED EMBODIMENTS

Figure 1:
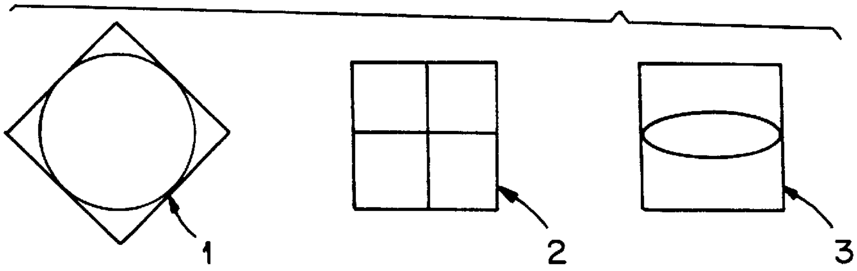
FIG. 1 is a plan view of three examples of unconnected electrically conducting sections according to the invention.

The electrically conducting sections 1, 2, 3 according to the invention shown in the drawings consist of copper wire which is bent in the shape of geometric figures. The wire is in each case formed as a contour or outline of two-dimensional geometric figures such as circles, arcs and squares. The invention can be just as simply carried out with other sections, and in particular sections in the form of three-dimensional geometric figures that are formed by suitably shaped wires or sheets. The figures may however also consist of other materials, in particular plastic material that is provided with an electrically conducting coating. An embodiment in which electrically conducting three-dimensional elements are lined up as a chain is also possible, for example balls in the form of a pearl necklace.

At the connection points 4 the electrically conducting sections 1, 2, 3 are connected to one another which, for example, may be effected by soldering or twisting so that they form a chain 5, 6 which can be indefinitely lengthened by joining further sections. In order however to completely or largely avoid a complicated connecting of the sections during the manufacture of the chain lead 5, 6, the wires are continuously formed at the connection points 4, i.e. at the transition from the one to the neighboring section. The manufacture is simplest when the arrangement of the sections is selected such that the chain lead 5, 6 is knotted from one or more wires, without a particular operating procedure being required for the connection of the sections 1, 2, 3.

An electrically conducting section 1, 2, 3 may be in the form of several geometric figures interlaced into one another. For example, the section 1 consists of a square in which a circle is incorporated, section 2 consists of four smaller squares which together form a larger square, and section 3 of a square in which two complementary arc sections are incorporated.

Figure 2:
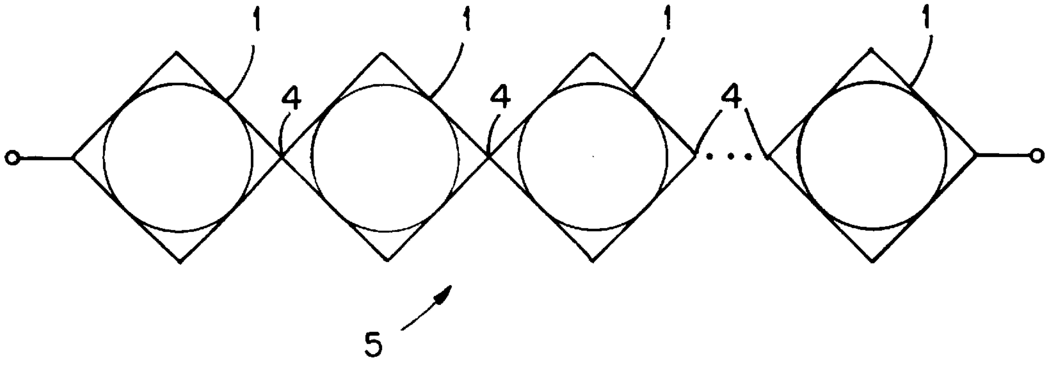
FIG. 2 is a plan view of a first embodiment of an electrical lead according to the invention consisting of a chain of the equal electrically conducting sections.
Figure 3:
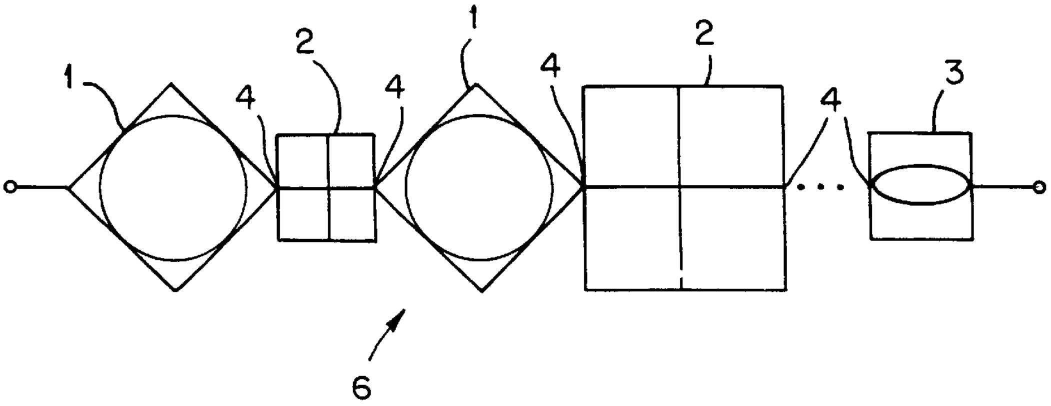
FIG. 3 is a plan view of a second embodiment of an electrical lead according to the invention, which consists of a chain of various sections of different sizes.

The chain lead may consist of many equal sections, as in the chain lead 5 shown in FIG. 2, which consists of only sections 1 joined together. Alternatively the chain lead may consist of various sections, as in the chain lead 6 shown in FIG. 3, which consists of the joined sections 1, 2 and 3. Also sections of the same shape and differing sizes may be combined as can be likewise recognized in FIG. 3 where the section 2 appears in two different sizes.

Such chain leads 5, 6 according to the invention may advantageously be used for the electrical supply of electrical apparatus at locations which are often sought after by people and where usual electrical leads do not have a particularly aesthetic effect, for example in living and working rooms, but also in the open air. Due to their decorative effect the leads 5, 6 according to the invention are especially useful for hanging lamps. For this application it is not necessarily required that the complete electrical current circuit is equipped with the leads according to the invention. Rather for reasons of cost they are used above all where they under usual circumstances come into view and are perceived. Apart from the energy supply the leads according to the invention may of course also be used for information transmission. Such electrical leads may be called the Maya Electrical Transmission System.

While the invention has been illustrated and described as embodied in improved electrical leads, it is not intended to be limited to the details shown, since various modifications and changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and is set forth in the following appended claims.

We claim:

1. An electrically conducting lead consisting of a plurality of electrically conducting sections connected with each other in a chain (5,6), wherein said electrically conducting sections are electrically connected with each other one after the other at respective connection points (4) in said chain, each of said electrically conducting sections is in the form of a two-dimensional figure or a three-dimensional figure and neighboring pairs of said electrically conducting sections are electrically connected with each other at said respective connection points (4) by soldering or twisting together.

2. The electrically conducting lead as defined in claim 1, wherein said electrically conducting sections are identical to each other.

3. The electrically conducting lead as defined in claim 1, wherein each of said electrically conducting sections comprises a wire piece bent in the form of a square, a rectangle, a triangle, a circle, a polygon, an ellipse, an arc, a spiral or a star, in order to obtain a predetermined aesthetic effect on an observer.

4. The electrically conducting lead as defined in claim 1, wherein each of said electrically conducting sections comprises at least one wire piece and said at least one wire piece is shaped to form at least two interlaced geometric figures, and said at least two geometric figures are selected from the group consisting of squares, rectangles, triangles, circles, polygons, ellipses, arcs, spirals and stars, in order to obtain a predetermined aesthetic effect on an observer.

5. The electrically conducting lead as defined in claim 4, wherein said at least two interlaced geometric figures consist of a circle in a square (1), a plurality of smaller squares in a larger square (2) or two arcs in a square (3).

6. The electrically conducting lead as defined in claim 1, wherein each of said electrically conducting sections comprises a planar body, said planar body comprises sheet metal or an electrically conducting foil, and said planar body is in the form of a square, a rectangle, a triangle, a circle, a polygon, an ellipse, an arc, a spiral or a star, in order to obtain a predetermined aesthetic effect on an observer.

7. The electrically conducting lead as defined in claim 1, wherein each of said electrically conducting sections comprises a three-dimensional element and said three-dimensional element is a sphere, a cube, a parallelepiped, a tetrahedron, a pyramid, a spiral or a star, in order to obtain a predetermined aesthetic effect on an observer.

8. The electrically conducting lead as defined in claim 1, wherein each of said electrically conducting sections comprises at least two three-dimensional elements and said at least two three-dimensional elements are selected from the group consisting of spheres, cubes, parallelepipeds, tetrahedrons, pyramids, spirals and stars, in order to obtain a predetermined aesthetic effect on an observer.

9. The electrically conducting lead as defined in claim 1, wherein each of said electrically conducting sections comprises copper wire.

10. The electrically conducting lead as defined in claim 1, wherein each of said electrically conducting sections consists of a plastic material coated with an electrically conductive coating.

* * * * *